March 10, 1936.   H. ABRAMSON   2,033,318
INDICATOR GEAR FOR MEASURING INSTRUMENTS AND THE LIKE
Filed June 21, 1932   3 Sheets-Sheet 1
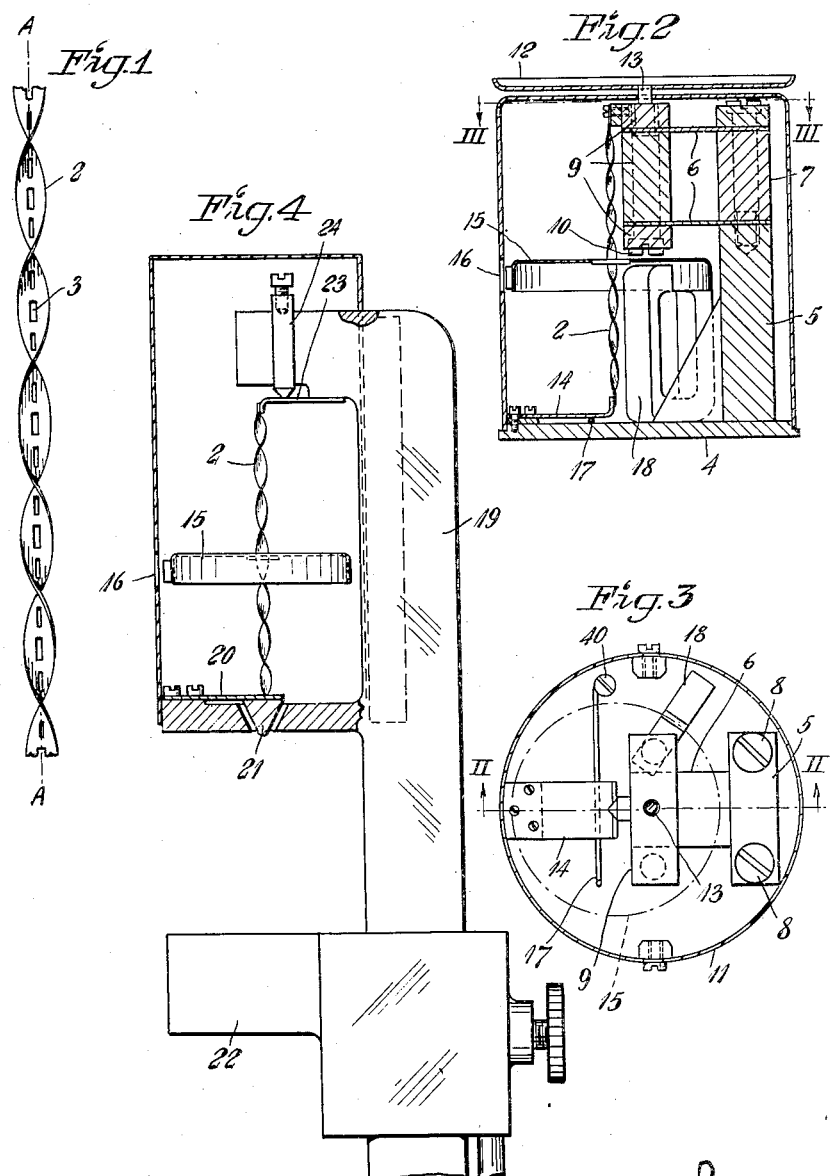

March 10, 1936.  H. ABRAMSON  2,033,318
INDICATOR GEAR FOR MEASURING INSTRUMENTS AND THE LIKE
Filed June 21, 1932  3 Sheets-Sheet 2
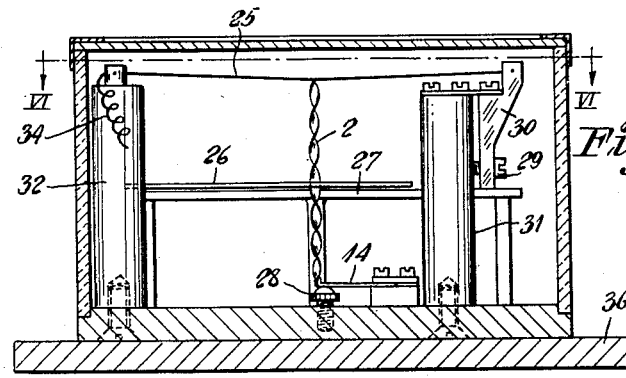
Fig. 5
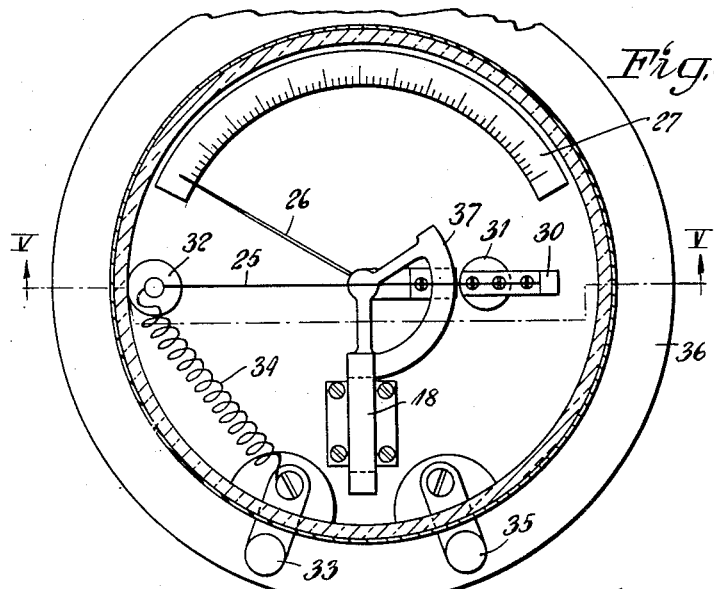
Fig. 6
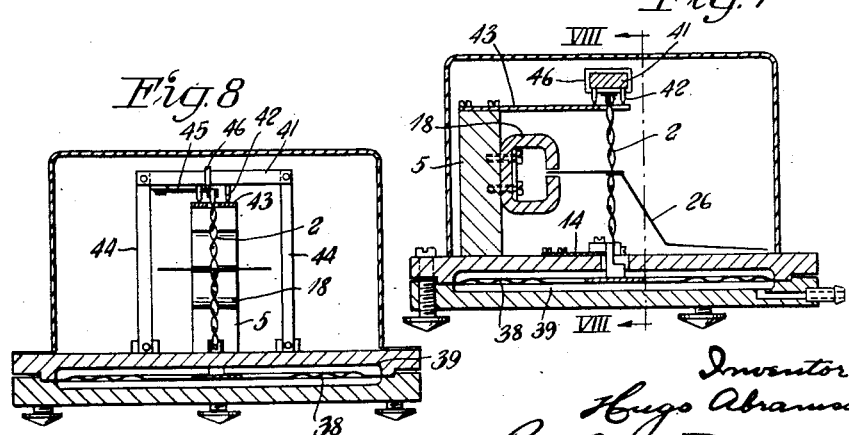
Fig. 7
Fig. 8
Inventor:
Hugo Abramson,
By Byrnes, Townsend & Potter
Attorneys.

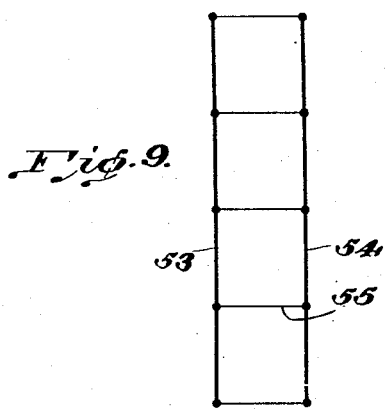
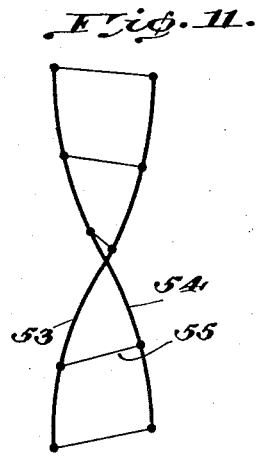
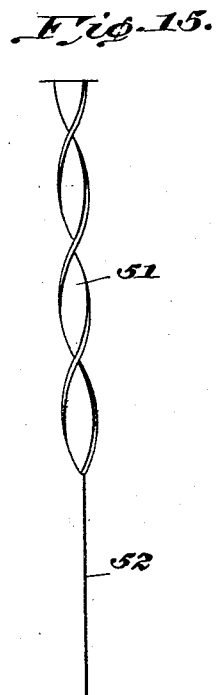
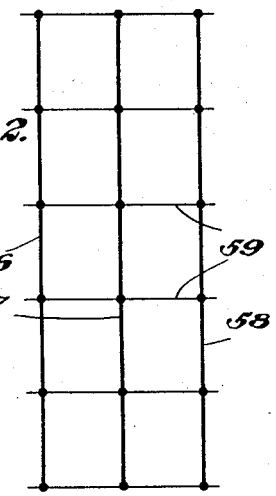
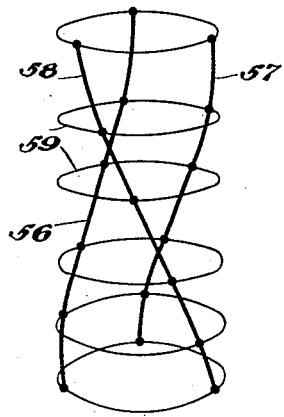
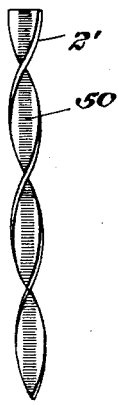
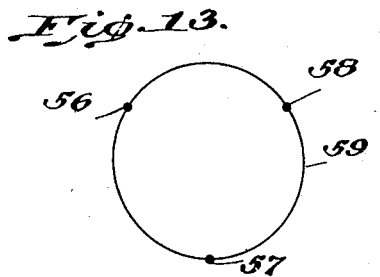

Patented Mar. 10, 1936

2,033,318

UNITED STATES PATENT OFFICE 2,033,318

INDICATOR GEAR FOR MEASURING INSTRUMENTS AND THE LIKE

Hugo Abramson, Lidingo, Sweden

Application June 21, 1932, Serial No. 618,532
In Sweden July 7, 1931

17 Claims. (Cl. 73—151)

The present invention refers to indicator gears, particularly for measuring instruments, such as weighing apparatus. pressure gauges, barometers, electrical measuring instruments, and so forth, and has for its object to provide a gear of said type which is simple and, consequently, inexpensive in manufacture, while facilitating exceedingly accurate measurements.

The indicator gear according to the invention comprises a member of resilient material twisted about its own longitudinal axis, said member being adapted to be actuated by the quantity to be indicated in that the member is subjected to a mechanical load under the influence of said quantity, which load results in lengthening or shortening of the member by the same being straightened out or the opposite, the member performing a turning movement when thus lengthened or shortened, and an indicating member connected with said resilient member to indicate said turning movement.

The invention will be described more fully in the following with reference to the accompanying drawings which illustrate a few embodiments thereof by way of example, other features characteristic of the invention being then also set forth.

Fig. 1 shows a resilient member made in accordance with the invention,

Fig. 2 is a vertical sectional view of a weighing machine embodying the invention, taken on the line II—II of Fig. 3, Fig. 3 is a horizontal section taken on the line III—III of Fig. 2, Fig. 4 is a side elevation, partly in section, of an instrument for measuring lengths, Fig. 5 is a vertical sectional view of an electricity meter, taken on the line V—V of Fig. 6, Fig. 6 is a horizontal sectional view taken on the line VI—VI of Fig. 5, Fig. 7 is a vertical central sectional view of a pressure gauge, Fig. 8 is a vertical sectional view on the line VIII—VIII of Fig. 7, Fig. 9 is a side elevation of a modified form of the resilient element, before twisting, Fig. 10 is an end view thereof, Fig. 11 is a side elevation of the form shown in Fig. 9, after twisting, Fig. 12 is a side elevation of a further modification of the resilient element, before twisting, Fig. 13 is an end view thereof, Fig. 14 is a side elevation of the form shown in Fig. 10, after twisting, Fig. 15 is a side elevation of another modification of the resilient element, and Fig. 16 is a side elevation of a further modification of the resilient element.

The member shown in Fig. 1 consists of a leaf spring 2, which may be made of phosphor-bronze, for example, or other resilient material. According to the invention, the spring 2 is made of a longilateral member twisted about its own longitudinal axis, preferably in such a manner that the two halves thereof are twisted in opposite directions, starting from the center, as will appear from the drawings. Through the twisting of the spring, the edge portions thereof will extend helically, while the portion of the spring adjacent to the center line A—A will extend substantially rectilinearly. If the member formed in this manner is subjected to a pull at one or both of two points of attachment, the distance between these points will be increased, that is to say, the member as a whole is lengthened, a turning movement of the same being obtained at the same time. This feature, i. e. transforming the variations in length of the member into a turning movement thereof, is utilized according to the invention to bring about an indicator gear, as will be explained more fully in the following. When the member is stretched, its edge portions permit of lengthening by being straightened out, the turning movement accruing therefrom. Especially when a great sensitivity is called for it may be suitable, to facilitate and to increase the turning movement of the member for a given alteration of the distance between its points of attachment, to partly remove the central portion of the member, for instance, by stamping out a row of apertures 3 longitudinally thereof. For the same purpose a goffering 50 or the like is provided centrally of the member 2' as shown in Fig. 16. By any of these features the sensitivity of the spring is considerably increased and the turning movement of the member may be effected by a very small force acting in the longitudinal direction of the member.

Figs. 2 and 3 illustrate a weighing apparatus made in accordance with the invention, said apparatus being provided with an arm 5 arranged on a base plate 4, said arm carrying two leaf springs 6. These springs are preferably separated from each other through an intermediate member 7, and are secured to the arm 5 by means of screws 8. The end portions of the springs 6 projecting from the arm 5 are inserted between three plates 9 connected with each other by means of screws 10. A balance dish 12 arranged above the outer casing 11 of the weighing apparatus is connected with the plates 9 through a pin 13 so that, when an object is placed on the dish, a downward bending of the springs 6 will be obtained corresponding to the weight of said object. A spring 2 preferably formed in the manner set forth according to the invention is connected at its one end with one of the plates 9, while its other end is secured in a spring arm 14 arranged at right angles thereto and attached in the base plate 4. Arranged on the spring 2 is a disk-like graduated scale 15, which may be read off from the outside through a window 16 in the outer casing 11. When the spring 2 is secured between the points of attachment a certain initial tension is imparted to the spring, and the scale is arranged or graduated in such a manner as to be adjusted to a zero position when the balance dish is unloaded. The deflection of the scale may be varied relatively to the straightening of the spring 2 with the aid of the spring arm 14 and an adjusting knife-edge 17 arranged underneath the same, said knife-edge being pivotally arranged about a point 40, so that when moved toward the one or the other side said knife-edge will increase or reduce the free length of the spring arm 14. If the spring arm 14 has a small free resilient length, the deflection answering one and the same movement of the plate 9 will be greater than if the spring arm 14 had a great resilient length. A brake magnet 18 of a type known per se is preferably arranged to engage the scale 15, so that after the scale has been caused to move, such movement is quickly braked at the deflection to be indicated by the scale. For this reason the scale 15 is made of a suitable material adapted to bring about said damping effect.

The device operates in the following manner:

If an object be placed on the balance dish 12, this dish will be lowered by a certain distance, together with the plates 9, and the springs 6 will be bent downwardly. This taking place, the distance between the points of attachment of the spring 2 is reduced, resulting in a turning movement of the spring, the same having from the beginning been given a certain initial tension, as stated, that is to say, the spring has been secured in a stretched condition. The scale 15, which is preferably arranged at the center of the spring 2, where by reason of said formation of the spring the turning movement is greatest, follows the spring in the turning movement thereof, the scale thus indicating the magnitude of the downward bend of the springs 6, that is to say, the weight of the object placed on the balance dish.

The ratio of gear obtained between the turning movement of the scale 15 on the one hand and the downward bend of the springs 6 and the alteration in length of the spring 2 on the other hand will be very great on account of the formation of the spring 2 in accordance with the invention. This is so for the reason that the spring 2 need only be subjected to a very small alteration in length, in order to cause turning of the scale and the central portion of the spring by one revolution. Consequently, the arrangement according to the invention requires a very simple mechanism only, the same thus becoming simple and inexpensive in manufacture while requiring very little space. If desired, the device according to the invention permits weighing of heavy objects to the accuracy of a fraction of a gram, which hitherto has not been possible to attain in weighing apparatus of the type in common use. Furthermore, the possibility of errors through friction, such as those occurring in gearings involving levers and the like, is entirely eliminated, the spring according to the invention operating altogether without friction. A change in the ratio of gear between the alteration in length of the spring and the turning movement thereof may be effected by varying the width of the spring.

The invention may also be advantageously used in instruments for longitudinal measurements, especially for the measuring of very small lengths, as will appear from the embodiment disclosed in Fig. 4. In this embodiment, a twisted spring 2 is secured between an arm 19 and a knife-edge 21 movably attached to the spring 20. The object to be measured is placed between a displaceable part 22 and the knife-edge 21, a deflection of the scale 15 being then obtained corresponding to the distance over which the knife-edge is raised when the object in question is brought into contact therewith. By suitable formation of the spring very small units can be accurately measured on account of the great ratio of gear between the turning movement of the spring and the alteration in length thereof. 23 designates an adjusting spring having an adjusting device 24 bearing thereon, whereby the free length of the spring 23 may be increased or decreased.

Figs. 5 and 6 show an electricity meter in accordance with the invention. A metal wire 25 is traversed by the electrical current, the amperage and the voltage of which are to be measured, the wire expanding by the heating effect of the current, which expansion brings about an alteration in the length of the twisted spring 2. A pointer 26 connected with this spring indicates the alteration in length of the spring 2 on a scale 27, which latter may be graduated so as to directly indicate the strength and the tension of the current passing through the wire 25, in amperes and volts respectively. The angle of inclination formed by the metal wire 25 between the points of attachment thereof at the ends of the wire and the point of connection of the spring 2, and thus the magnitude of deflection at a certain temperature, may be varied by means of a spring arm 14 secured in the plate 4 and with the aid of an adjustable screw 28 bearing against said spring. The wire 25 is adjusted by means of a member 30 provided with a set screw 29. This member is connected to an arm 31, and the other end of the wire 25 is connected with an arm 32. Preferably the arm 31 is made of a conducting material, so that a circuit is obtained between a terminal 33, a wire 34, the metal wire 25, the member 30, the arm 31, the plate 4 and a terminal 35. The arm 32 is made of an electrically insulating material which is also the case with a plate 36 provided underneath the plate 4.

The pointer 26 is connected to a disk 37 cooperating with a brake magnet 18 having for its object to bring about a damping effect at the deflection of the pointer.

Figs. 7 and 8 disclose an application of the invention in pressure gauges for the measuring of very small pressure variations. A spring 2 made in accordance with the invention is connected to a diaphragm 38, which is arranged in a chamber 39 in the lower part of the pressure gauge. A supporting cross member 41 rests by means of dowels 42, preferably three in number, on a spring 43 secured on an arm 5, and is connected at the ends thereof with two bands 44, one on each side of the knife-edges 42. The upper end of the twisted spring 2 is secured in an adjusting spring 45, which is connected to the supporting cross member 41. The free resilient length of the spring 45 is adjusted in a similar manner to that described hereinabove, with the aid of an adjusting device 46 displaceable along the cross member 41. The cross member 41 is pressed upwardly by the spring 43 so that the bands 44 are tensioned, the twisted spring 2 obtaining its tension according to the adjustment of spring 45 at the same time. The bands 44 are made of a material of the same or approximately the same thermal coefficient of expansion as that of the spring 2, to compensate for changes in the length of the spring 2 due to temperature variations, so that such changes may take place, without the force acting in the stretching of the spring being altered. Through this compensating arrangement, the influence of the temperature on the deflection of the pointer 26 is eliminated. The bands 44 are preferably made of approximately the same section as the spring 2, so that on variations of the temperature they will expand or contract exactly simultaneously with the spring 2.

In the embodiments disclosed with reference to Figs. 2-4, compensation for the influences of the temperature on the length of the spring 2 can also be effected by making the element keeping the spring in a stretched condition of a material of the same thermal coefficient of expansion as that of the spring itself. This is true for instance with respect to the post 5 and the intermediate member 7 shown in Fig. 2. To eliminate the influence of the temperature on the deflection of the spring 2, the same or the bands 44, or the above-mentioned element, may consist of so-called invar or other material which is comparatively constant at variations in temperature.

The formation of the resilient members according to the invention may obviously be varied in a number of different ways, without the principle of the invention being departed from. Thus, as shown in Fig. 15, the spring 51 may be twisted in one direction all over its length, the spring being connected at the one end thereof with a torsion wire 52. If a force be applied at the free end of the torsion wire or the remote end of the spring, the latter will be untwisted in this case also. In Figs. 9 to 14 are shown embodiments of the invention in which in place of leaf springs, wires of resilient material may be employed, if desired, particularly if the requisite force for altering the length of the spring is to be kept at a low value, two or more wires of the said kind then permitting of being connected by means of intermediate members, such as rings or plates, which are placed at a suitable distance from each other, whereupon the wires thus united are twisted spirally.

Figs. 9, 10 and 11 show the use of two parallel wires 53 and 54 connected by intermediate pieces such as bars 55 spaced at suitable distances from each other, Fig. 9 showing the spring before being twisted about its own longitudinal axis and Fig. 11 showing the same after twisting.

In Figs. 12, 13 and 14 an embodiment is shown using three or more parallel wires 56, 57 and 58 connected by intermediate members such as rings 59, Fig. 12 showing this member untwisted and Fig. 14 showing the same after it is twisted about its own longitudinal axis. Springs made and twisted in this manner may be compared with a spring in accordance with Fig. 1, that is to say, with a leaf spring having apertures or a goffering or the like provided therein along the longitudinal axis.

What I claim is:—

1. Indicator gear comprising a longilateral member of a material which possesses torsion elastic properties but has in itself substantially no tensibility or compressibility twisted about its own original longitudinal axis into a spring member having said axis substantially unchanged and extending rectilinearly and having the edge portions of said member extending helically, means for subjecting said spring member to a longitudinally exerted change of load under the influence of a quantity to be measured, whereby the spring member is subjected to stresses altering the length thereof with variations in said quantity, which stresses result in corresponding turning movements, and an indicating member operated by the turning movements of said spring member.

2. Indicator gear as defined in claim 1 wherein the longilateral member comprises a metal strip twisted about its own longitudinal axis.

3. Indicator gear as defined in claim 1 wherein the longilateral member comprises a metal strip twisted about its own longitudinal axis, said strip having its central portion reduced by the removal of material therefrom.

4. Indicator gear as defined in claim 1 wherein the spring member comprises at least two wires which are mutually connected by at least two intermediate members, arranged at suitable intervals apart, the whole combination being twisted about its own longitudinal axis and arranged between two points of attachment in such a manner that said combination as a whole will turn about its axis if the distance between the points of attachment of said combination is altered due to a change in mechanical load, brought about by the quantity to be measured.

5. Indicator gear comprising a longilateral resilient member twisted about its own original longitudinal axis into a spring member having said axis substantially unchanged and extending rectilinearly and having the edge portions of said member extending helically, a fixed member supporting one end of said spring member and a movable member supporting the other end of said spring member, means for subjecting said movable member to a change of load under the influence of a quantity to be measured whereby the spring member is subjected to lengthening or shortening stresses with variations in said quantity, which lengthening or shortening stresses result in corresponding turning movements, and an indicating member operated by the turning movements of said spring member.

6. Indicator gear comprising a longilateral resilient member twisted in both directions from a point intermediate its ends about its own original longitudinal axis, into a spring member having said axis substantially unchanged and extending rectilinearly and having the edge portions of said member extending helically, means for subjecting said spring member to a longitudinally exerted change of load under the influence of a quantity to be measured, whereby the spring member is subjected to lengthening or shortening stresses with variations in said quantity, which lengthening or shortening stresses result in corresponding turning movements, and an indicating member operated by the turning movements of said resilient member and connected to said spring member at the point where the direction of twist is changed.

7. Indicator gear as defined in claim 1 wherein one end of said spring member is supported by a spring arm the resilient length of which can be varied.

8. Indicator gear as defined in claim 1 wherein one end of said spring member is connected to temperature responsive means adapted to compensate for the thermal expansion and contraction of the spring member.

9. Indicator gear as defined in claim 1 wherein the spring member is secured between two points the distance apart of which is maintained by a member having substantially the same thermal coefficient of expansion as the spring member.

10. Indicator gear as defined in claim 1 wherein the member is twisted in the same direction along the whole of its length and is connected at one end with a torsion wire permitting a turning movement of the spring member when it is subjected to an alteration in load.

11. Indicator gear as defined in claim 1 including means for causing the variations in mechanical load to act in a direction which substantially coincides with the longitudinal axis of said spring member.

12. In a measuring instrument a transmission gear comprising a member made of material which has in itself substantially no tensibility or compressibility, said member being twisted about its own original longitudinal axis into a spring member having said axis substantially unchanged and extending rectilinearly and having the edge portions of said member extending helically and adapted to be actuated by a quantity to be ascertained so that said spring member under the influence of said quantity is subjected to a change of load which while altering the distance between the points of attachment of said spring member causes a lengthening or shortening of said spring member as it straightens out or becomes more twisted, as well as a resultant turning movement of the spring member which is connected to indicating means operated by said turning of said spring member, and means for causing the variations in mechanical load to act in a direction which substantially coincides with the longitudinal axis of said spring member.

13. In a measuring instrument as defined in claim 12 a parallel motion mechanism connected with the spring member and adapted to be actuated by the variations in load and to transfer them to said spring member.

14. In a measuring instrument as defined in claim 12 at least two spring arms connected to means which are in their turn connected to said spring member, said means being adapted to be actuated by the variations in mechanical load to be ascertained, the said spring arms extending angularly of said spring member and being fastened to at least one support arranged parallel to said spring member.

15. In a measuring instrument as defined in claim 12 at least two spaced spring arms connected to means which are in their turn connected to said spring member, said means being adapted to be influenced by the variations in mechanical load to be ascertained, the said spring arms extending in substantial mutual parallelism and at right angles to the said spring member and being fastened to at least one support arranged parallel to said spring member.

16. A measuring apparatus comprising an indicator gear as defined in claim 1 in combination with means for braking the movement of the spring member.

17. Indicator gear as defined in claim 1, wherein the spring member comprises at least two wires which are mutually connected by at least two intermediate members spaced along the length of said wires, the whole combination being twisted about its own longitudinal axis for a portion of its length in one direction and for another portion of its length in the opposite direction, said combination being arranged between two points of attachment in such a manner that said combination as a whole will turn about its axis if the distance between the points of attachment is altered due to a change in mechanical load, brought about by the quantity to be measured.

HUGO ABRAMSON.